United States Patent [19]

Dillon et al.

[11] 4,091,447
[45] May 23, 1978

[54] INTERRUPT CONTROL SYSTEM FOR A MICROCOMPUTER

[75] Inventors: Ronald David Dillon, Charleston; John Frederick Fisher, Saint Albans, both of W. Va.

[73] Assignee: Union Carbide Corporation, New York, N.Y.

[21] Appl. No.: 706,673

[22] Filed: Jul. 19, 1976

[51] Int. Cl.² ............................................. G06F 9/18
[52] U.S. Cl. ................................................. 364/200
[58] Field of Search ................ 340/172.5; 364/200 MS

[56] References Cited

U.S. PATENT DOCUMENTS

| | | | |
|---|---|---|---|
| 3,643,229 | 2/1972 | Stuebe et al. | 340/172.5 |
| 3,815,105 | 6/1974 | Adkins et al. | 340/172.5 |
| 3,825,902 | 7/1974 | Brown et al. | 340/172.5 |
| 3,909,794 | 9/1975 | Soltsien | 340/172.5 |
| 3,993,981 | 11/1976 | Cassarino, Jr. et al. | 340/172.5 |

*Primary Examiner*—Raulfe B. Zache
*Attorney, Agent, or Firm*—Eugene Lieberstein

[57] ABSTRACT

An interrupt control system for accepting and retaining a multiple of interrupt requests to a central processing unit of a microcomputer assigning a priority to each, generating an interrupt instruction, and a CPU interrupt signal including means for storing CPU register data and status flags upon receipt of said interrupt and restoring such data and flags when the interrupt task is complete. The control system also includes means for displaying certain data as controlled by the computer software program and for entering manual data.

6 Claims, 15 Drawing Figures

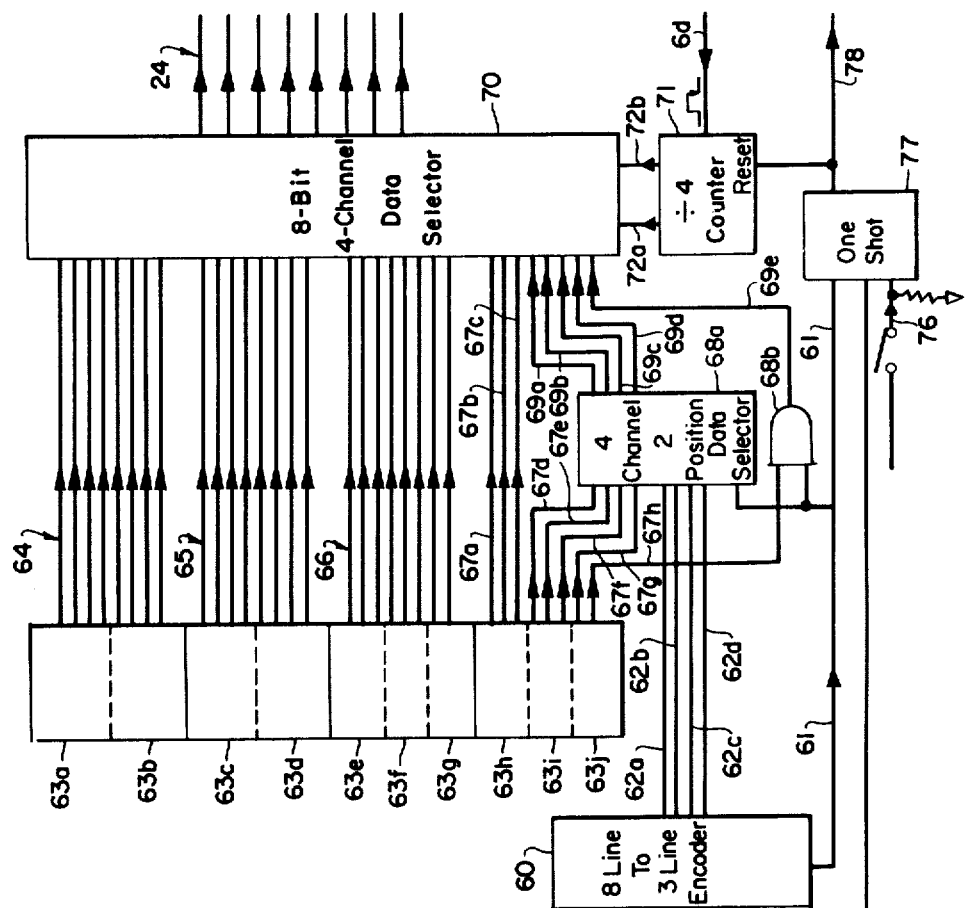
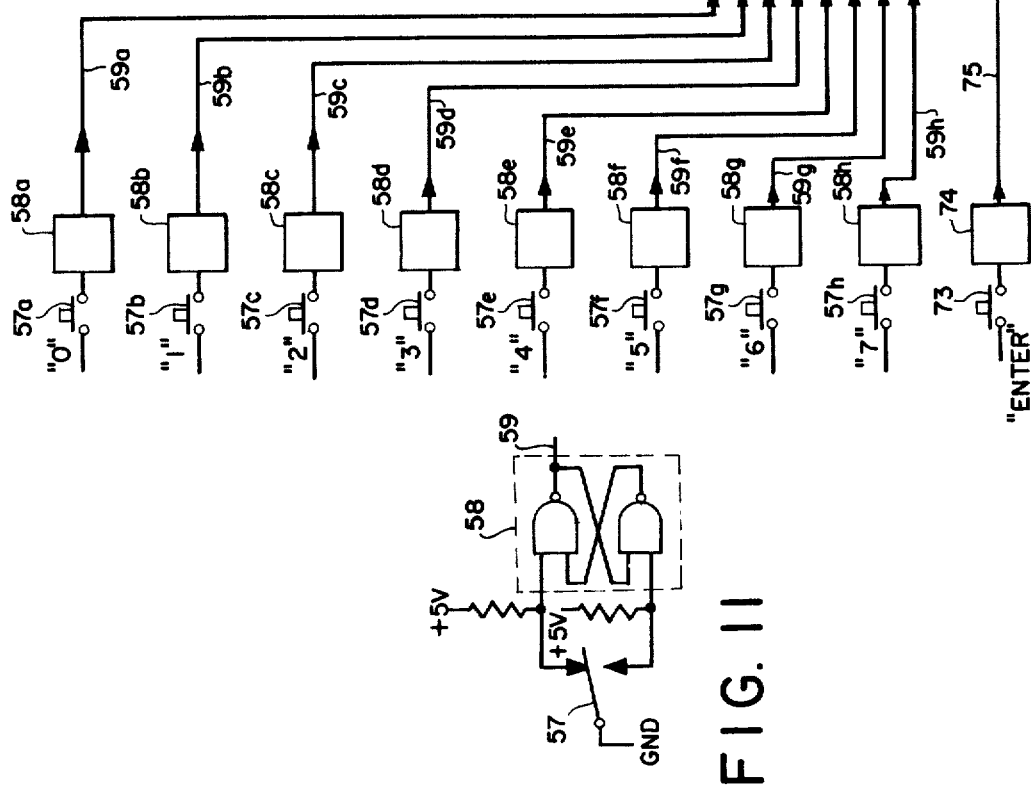
FIG. 10
FIG. 11

INTERRUPT CONTROL SYSTEM FOR A MICROCOMPUTER

This invention relates to a digital electronic system for controlling interrupts to a computer central processing unit.

BACKGROUND OF THE INVENTION

"Interrupts" to control program flow in a computer have been in use for some time, particularly when the operation of the computer must be synchronized with external events. The word "interrupt" is intended for purposes of the present invention to mean a signal which is internally or externally generated and recognizable by a central processing unit of a general purpose computer as a command to discontinue its current program of instructions and to begin a new subprogram of instruction. The computer may or may not be redirected back to the interrupted program upon completion of the subprogram. Most computers have some type of interrupt handling capability which may differ considerably from one type to another.

The present invention was developed primarily to provide interrupt handling capability for a microcompputer system having a very limited memory, such as, for example, the MCS-8 system manufactured for commercial sale by the Intel Corporation. The MCS-8 has a single chip central processing unit, hereinafter referred to simply as a CPU, which is an 8-bit parallel processor that is capable of addressing only 16,384 eight bit words of memory. This processor has a limited amount of interrupt handling capability of its own. It will recognize an interrupt signal and can transfer program control from one point to another through a "call" or "jump" instruction. In a call instruction the sequence of addresses in the computer memory, which the central processing unit is currently using to locate its instructions, may be changed to a new sequence. Because it is a call instruction as opposed to a jump instruction, the address of the next instruction in the present sequence is saved within the CPU and control may be later returned to the present sequence by use of a return instruction. For interrupt servicing, the CPU will recognize a signal byte call instruction. This call instruction is hereinafter called a restart instruction and must be generated by external circuitry as part of an interrupt cycle. The CPU contains several internal data storage registers as well as an accumulator register which are used for temporary data storage and data manipulation. In addition, two of these internal registers are used for addressing an external memory for reading and writing data. The CPU also stores internally four status bits identified as the carry, zero, parity, and sign bit respectively, which are set according to the result of each arithmetic operation, and which may be tested for conditional branching. In the normal sequence of a program, these registers and status bits contain pertinent data and information for the proper execution of that program. If, however, the CPU receives and recognizes an interrupt and begins executing a new program with the intention of returning to the interrupted program, the data and information contained in these internal registers at the time the interrupt occurred, must be saved or stored in some manner so that the condition that existed when the interrupt occurred may be restored when control is restored to the original program. It should be noted here that the CPU automatically stores the sequential program address upon execution of the restart instruction for later recall with a return instruction. There is no internal provision, however, for storing the register data or status bits. It is also impossible to store this information in the usual external memory because two of the registers containing data to be saved are used for addressing the external memory. The present invention permits the data to be saved and restored by the use of the computer system output and input instructions along with a special dedicated memory system.

OBJECTS OF THE INVENTION

The primary object of this invention is to provide an interrupt system for handling a multiplicity of real time interrupt signals to a central processing unit of a computer as derived from independent sources with each having a predefined priority;

It is a further object of the present invention to provide an interrupt system for a central processing unit of a computer including memory means for saving CPU register data and status information upon the receipt of a predetermined interrupt request signal and for restoring said data and information upon receipt of a predetermined recall signal;

It is yet a further object of the present invention to provide an interrupt system for a central processing unit of a computer including manual data entry means and data display means.

DESCRIPTION OF THE DRAWINGS

Further objects and advantages of the present invention will become apparent from the following detailed description of the present invention when read in connection with the accompanying drawings of which:

FIG. 10 is a detailed circuit diagram of the data entry switch and data selector block of FIG. 1;

FIG. 11 is a detailed diagram of the pushbutton switch and electrical interface circuit of FIG. 10.

DETAILED DESCRIPTION OF THE INVENTION

The interrupt system of the present invention is able to accept up to four interrupt requests, retaining each, and generating a CPU interrupt and restart instruction for each depending upon its priority, with a higher priority interrupt request resulting in an interrupt of a lower priority interrupt sequence and with all lower priority interrupt requests reserved until each higher priority interrupt sequence is completed. Although the system as described is intended to handle only four interrupt requests it should be obvious that additional interrupt requests may be handled without modification of the concept underlying the invention.

Figure 1:
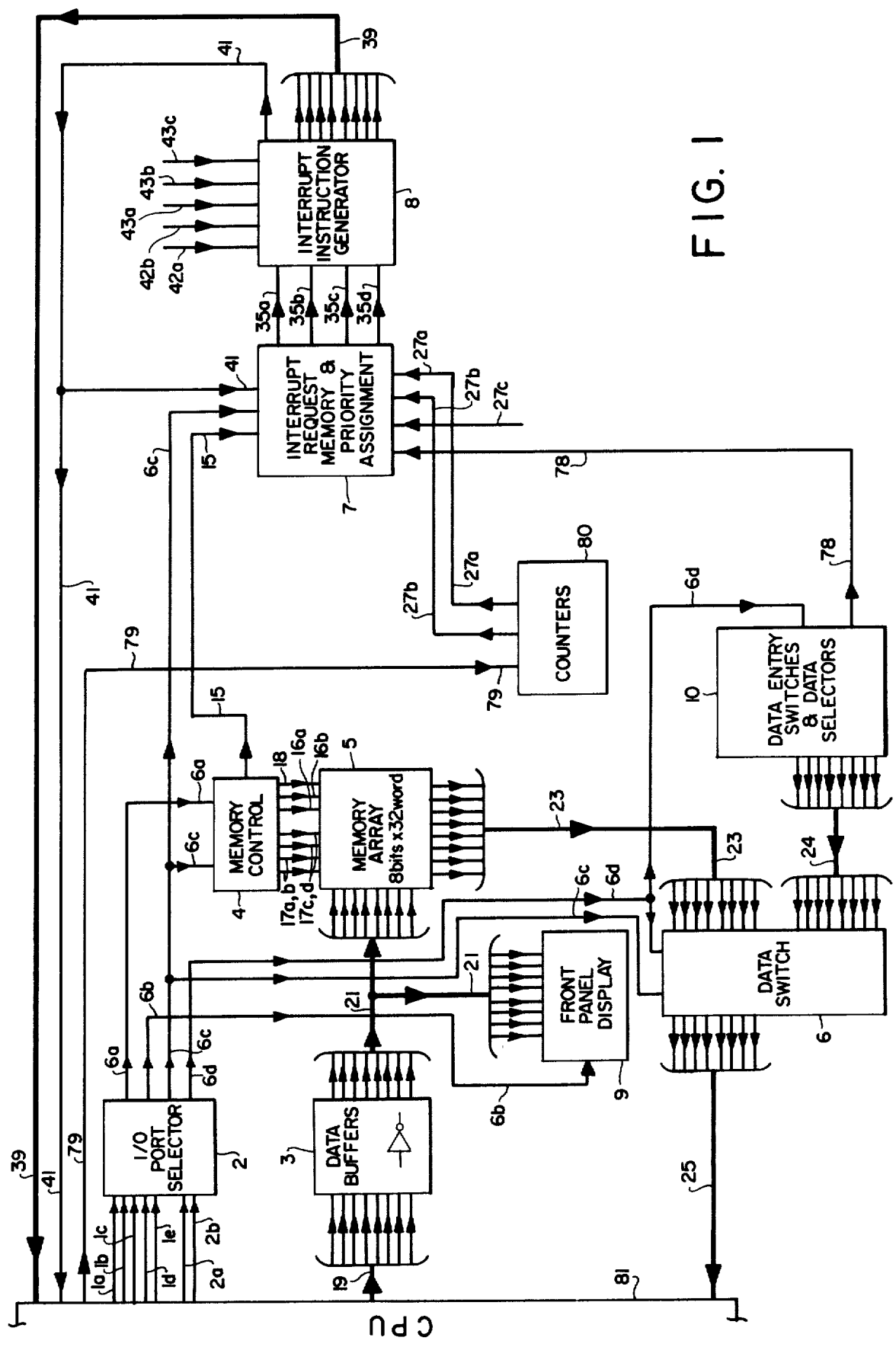
FIG. 1 is an overall block diagram illustrating the present invention.

Referring now to FIG. 1, which is a block diagram of the system of the present invention, an interrupt request pulse is received in the interrupt request memory block 7 from any of four independent sources on lines 27a, b, c, or 78 respectively. In the illustrated system of FIG. 1 two of the interrupt request lines 27a and b are periodically generated by counter 80 on a regular time basis, a third interrupt request 27c is open and available as an auxiliary interrupt and the fourth interrupt on line 78 is for manual data entry as will be more fully explained hereafter. If the system is not busy, that is, in the process of saving or restoring register data, as indicated by a logical high on lines 15 or 41, an interrupt pulse will be generated from the interrupt request memory block 7 on a predetermined one of the appropriate output lines 35a, b, c, or d corresponding to the priority of the request. At the same time, all lower priority interrupt requests will be locked out. The interrupt signal and instruction generator block 8, in response to a particular output on lines 35a, b, c, or d generates a predetermined eight bit restart instruction on the eight data line 39. At the same time, a CPU interrupt pulse on lines 41 is generated. Lines 39 and 41 are connected to the CPU 81 of a general purpose microcomputer, such as the Intel MCS-8. In addition to signalling the CPU 81 of an interrupt request, the interrupt pulse 41 is fed back to the interrupt request memory block 7 as an immediate busy signal which will prevent any other interrupt request from coming through until after the present request has been honored. Upon receipt of the interrupt pulse 41, the CPU 81 will read and execute the restart instruction on lines 39 and in a conventional fashion transfer control from one program to another.

If it is desired to store the register data and flag information contained in CPU 81, a subroutine program identified as SAVE and represented in Appendix A, is acted upon by the CPU 81 at the very beginning of the interrupt task after receipt of the appropriate restart instruction. The SAVE subroutine contains OUT 010 program instructions to the CPU 81 which in turn generate the port address number 010 on lines 1a through 1e connecting the input-output port selector 2 to the CPU 81. The input-output port selector 2 decodes the port address number 010 as will be more fully described later in the specification and generates a pulse on line 6a in response to each OUT 010 instruction. At the instant the pulse on line 6a is generated the register data to be stored is fed by the CPU 81 onto the eight data lines 19. This data is transferred to the memory data input lines 21 through the data buffer 3. The memory control 4 and memory array 5 make up a first-in last-out type stack memory in which data is stored by stacking it on top of previous data and retrieved by removing it from the top of the memory stack. This memory forms a stack 32 words high, each word being 8 bits in length. The memory control 4 in response to each pulse appearing on line 6a will cause a transfer of data from lines 21, in serial fashion, into memory 5. In addition, upon the occurrence of a pulse on line 6a the memory control 4 generates a busy signal on line 15 of predetermined duration sufficient to prevent interruption of the SAVE routine, i.e., of sufficient duration in time to have stored all register and flag data. Thereafter, the busy signal on line 15 is terminated. It should be pointed out here that removing the busy signal from line 15 does not clear the priority interrupt request memory circuit block 7 from accepting lower priority interrupts which remain locked out.

Upon completion of the interrupt tasks a subroutine identified in Appendix A, as RECAL may be used to restore the original data to the CPU register and flags. This subroutine makes use of an INP 000 program instruction, which causes data to be read into the CPU 81. The RECAL subroutine is initiated by the port address number (000) generated by the CPU 81 in response to the INP 000 instruction. This address (000) is decoded by the I/O port selector 2 which generates a pulse on line 6c. This pulse causes data on the top of the stack memory 5 to be placed on the memory output lines 23 which is then transferred through the data switch 6 onto the CPU data input lines 25. The same pulse on line 6c controls the data switch circuit 6 and causes a busy signal to be generated on line 15. In addition, the pulse on line 6c resets the lock-out in the priority interrupt register as will be explained hereafter in connection with FIG. 7 allowing the next lower priority interrupt to be generated when the busy signal is terminated.

The two highest priority levels of interrupt on lines 27a and 27b are generated at regularly spaced time intervals by the counters 80. The counters 80 are conventional frequency divider counter circuits consisting of a chain of solid state counters such as the TI SN7493 and TI SN7490 which are arranged to divide the system clock supplied from the CPU 81 from a frequency of 800 KHz on line 79 down to predetermined lower frequencies. Normally 10 pulses per second are used for the highest priority interrupt request 27a and one pulse per second is used for the second highest interrupt request 27b. These two signals 27a and 27b can be used to independently trigger predetermined subprograms running at 10 times per second and once per second respectively. The third level of interrupt is unassigned to any predetermined time base and the forth or lowest level of interrupt 78 is dedicated to manual data entry via the data entry switches and data selector block 10.

Accordingly, the software program for the microcomputer system may be written to include certain functions associated with interrupt operations, such as SAVE, RECAL MANUAL DATA ENTRY and PANEL DISPLAY. The SAVE and RECAL functions as indicated earlier contain the instructions OUT 010 and INP 000 respectively. Manual data entry to the microcomputer system is read by the computer software program instruction INP 001 whereas data can be displayed in the front panel display 9 by using the computer software program instruction OUT 011.

Figure 2:
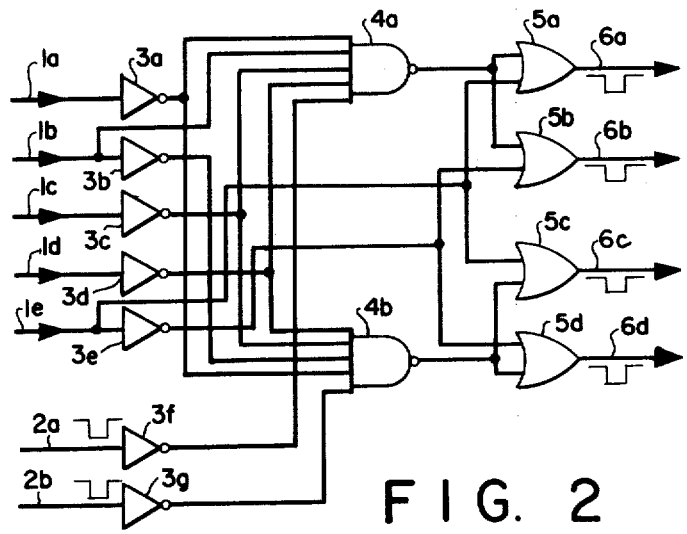
FIG. 2 is a detailed circuit diagram of the input-output port selector block of FIG. 1.

The input-output (I/O) port selector 2 is shown in detail in FIG. 2. The five input lines 1a, 1b, 1c, 1d, and 1e respectively, carry port address data generated by the CPU 81 in response to the particular INP/nnn and OUT/nnn program instruction as indicated above. Two additional control lines 2a and 2b respectively are pulsed low by the CPU 81 to indicate and OUT and INP operation, respectively. The circuits 3a-3g respectively are conventional inverters and may represent sections of a standard TTL integrated circuit for inverters such as the Texas Instrument SN 7404. The five input NAND gates 4a and 4b are the two sections of an integrated circuit such as the National DM 8092 and the 2-input OR gates 5a-d may be the four sections of a Texas Instrument SN 7432. The interconnections shown in FIG. 2A give a logic through-put as indicated by the following truth table:

| FUNCTION | INSTRUCTION | INPUTS | | | | | | | OUTPUTS | | | |
|---|---|---|---|---|---|---|---|---|---|---|---|---|
| | | 1a | 1b | 1c | 1d | 1e | 2a | 2b | 6a | 6b | 6c | 6d |
| OUT 010 | SAVE | 0 | 1 | 0 | 0 | 0 | 0 | x | 0 | 1 | 1 | 1 |
| OUT 011 | PANEL DISPLAY | 0 | 1 | 0 | 0 | 1 | 0 | x | 1 | 0 | 1 | 1 |
| INP 000 | RECALL | 0 | 0 | 0 | 0 | 0 | x | 0 | 1 | 1 | 0 | 1 |
| INP 001 | DATA ENTRY | 0 | 0 | 0 | 0 | 1 | x | 0 | 1 | 1 | 1 | 0 |
| | | all others | | | | | | | 1 | 1 | 1 | 1 | x = don't care

Figures 3, 6:
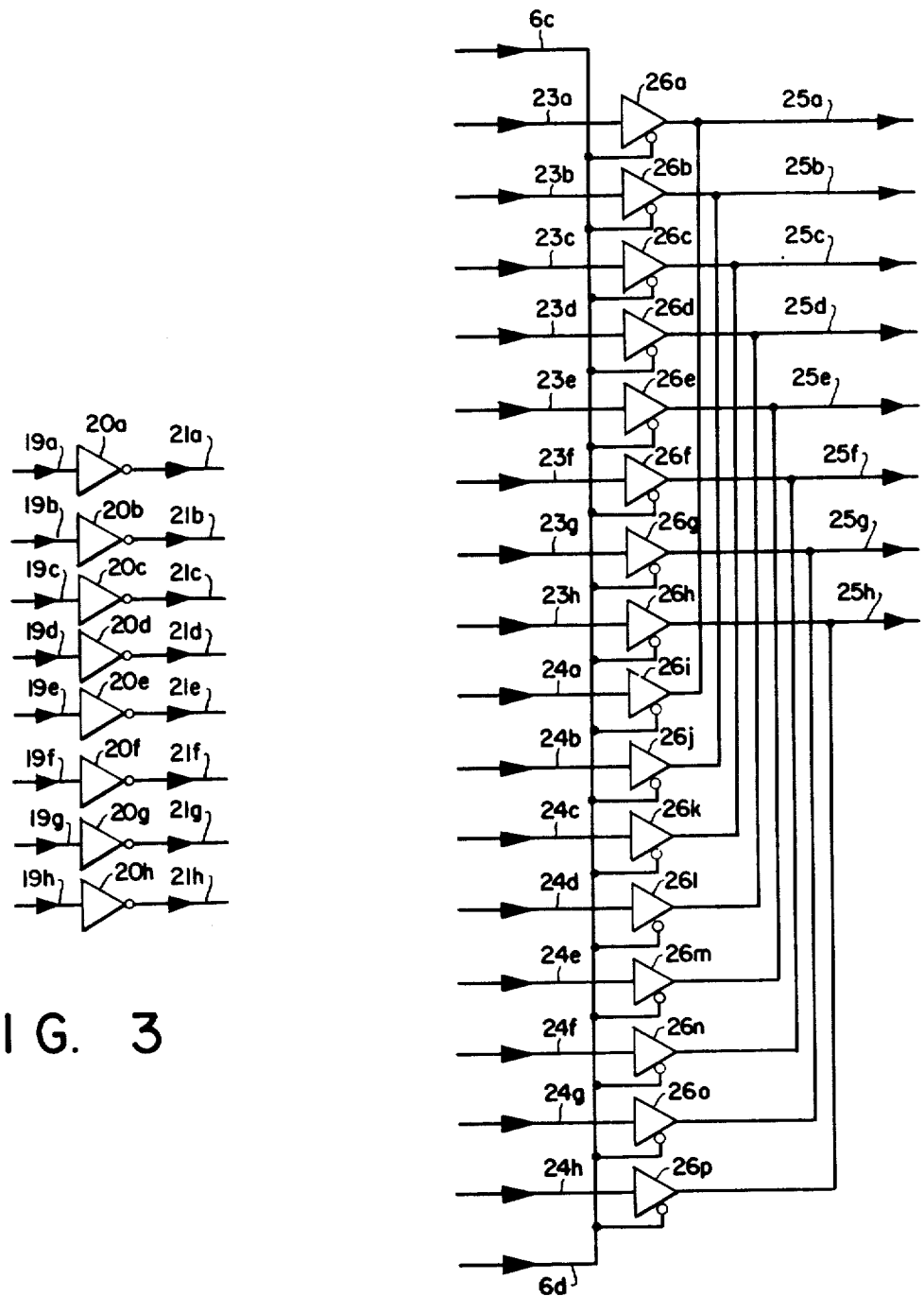
FIG. 3 is a detailed circuit diagram of the data buffer block of FIG. 1.
FIG. 6 is a detailed circuit diagram of the data switch block of FIG. 1.

FIG. 3 shows the data buffers 3 of FIG. 1 as simply eight sections of hex inverters such as the Texas Instrument SN 7404. These serve to reinvert the data which comes from the CPU 81 in an inverted form.

Figure 4:
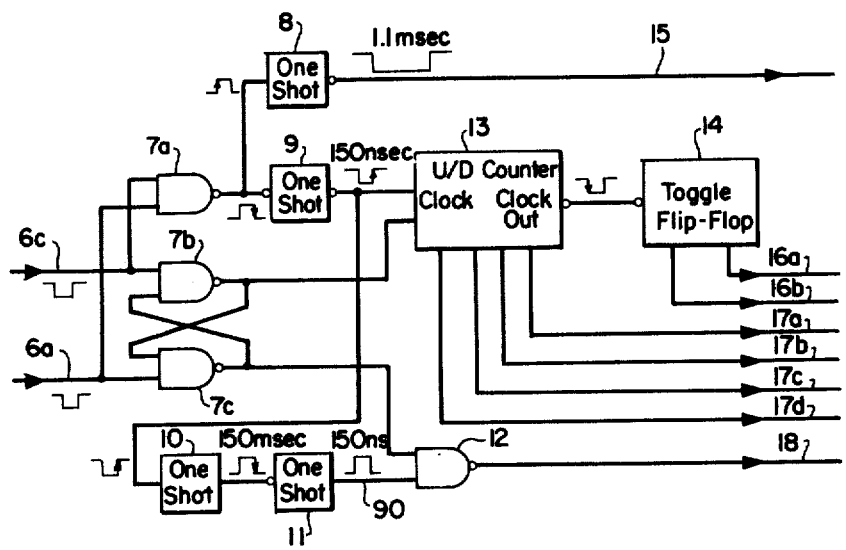
FIG. 4 is a detailed circuit diagram of the memory control block of FIG. 1.
Figure 12:
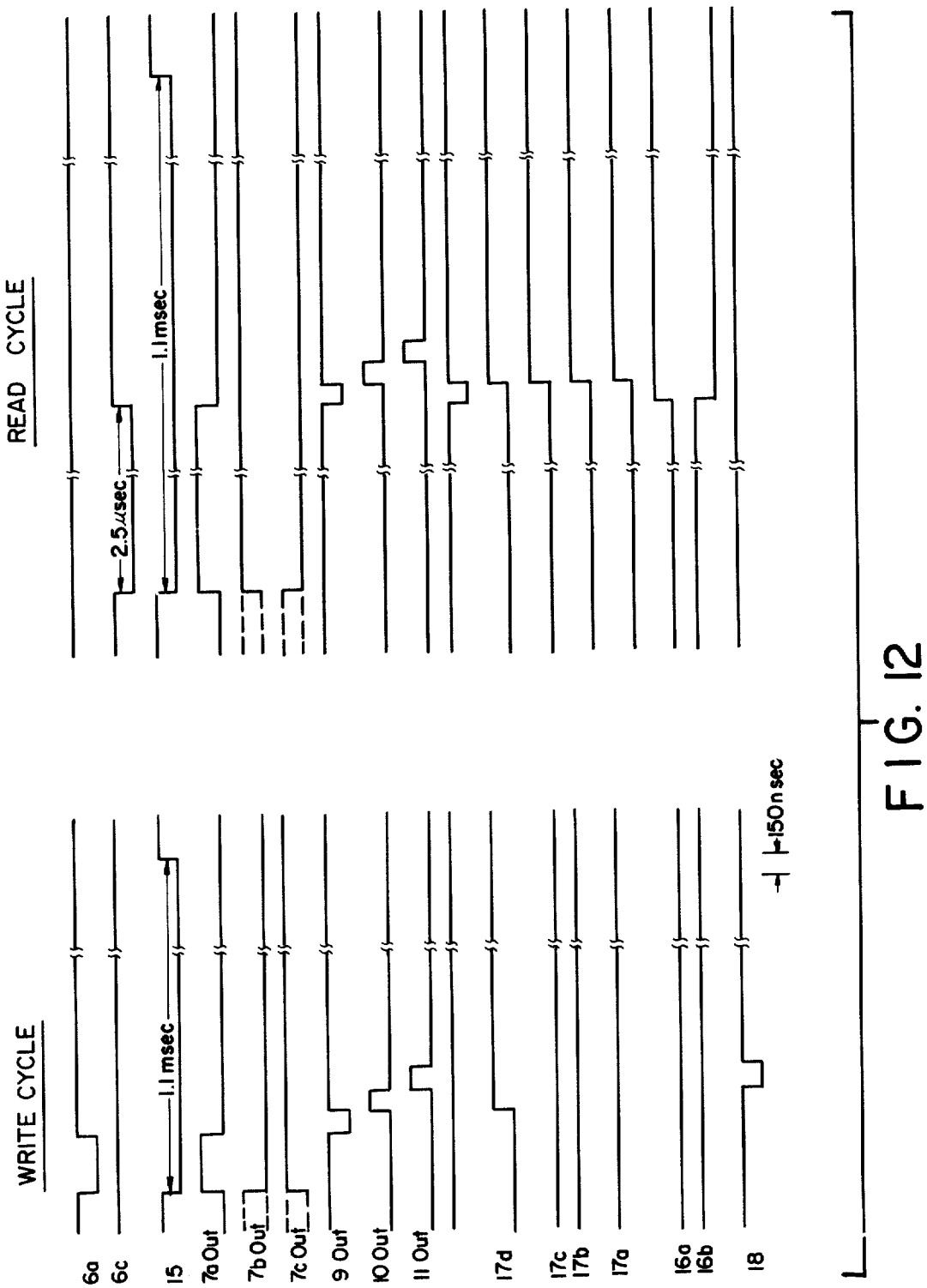
FIG. 12 is a timing diagram for the memory control of FIG. 1.

The stack memory control 4 of FIG. 1 is shown in detail in FIG. 4 with a corresponding timing diagram shown in FIG. 12. This circuit keeps track of the address at the top of the memory stack 5 and changes that address in the appropriate direction when data is read from or written into memory. When the memory control circuit 4 receives a low going OUT 010 pulse on line 6a, the R-S flip-flop, made up by interconnecting NAND gates 7b and 7c in a conventional manner, is set with the ouput of NAND gate 7b and NAND gate 7c high. This sets the count direction of a conventional up/down counter 13 such as TI SN 7491 in the up direction so that a clock pulse input to it will cause it to be incremented. The high on the output of gate 7c is fed to NAND gate 12. Because this is a NAND gate, this allows signals on its other input, line 90, to pass through the gate. Conversely, a low going INP 000 pulse on line 6c, causes the R-S flip-flop of combined gates 7b and 7c respectively to be reset, setting the count direction of counter 13 in the down direction so that a clock pulse will cause the counter to be decremented. The input to gate 12 from gate 7c will be made low, preventing signals to its other input on line 90 from getting through.

Figure 5:
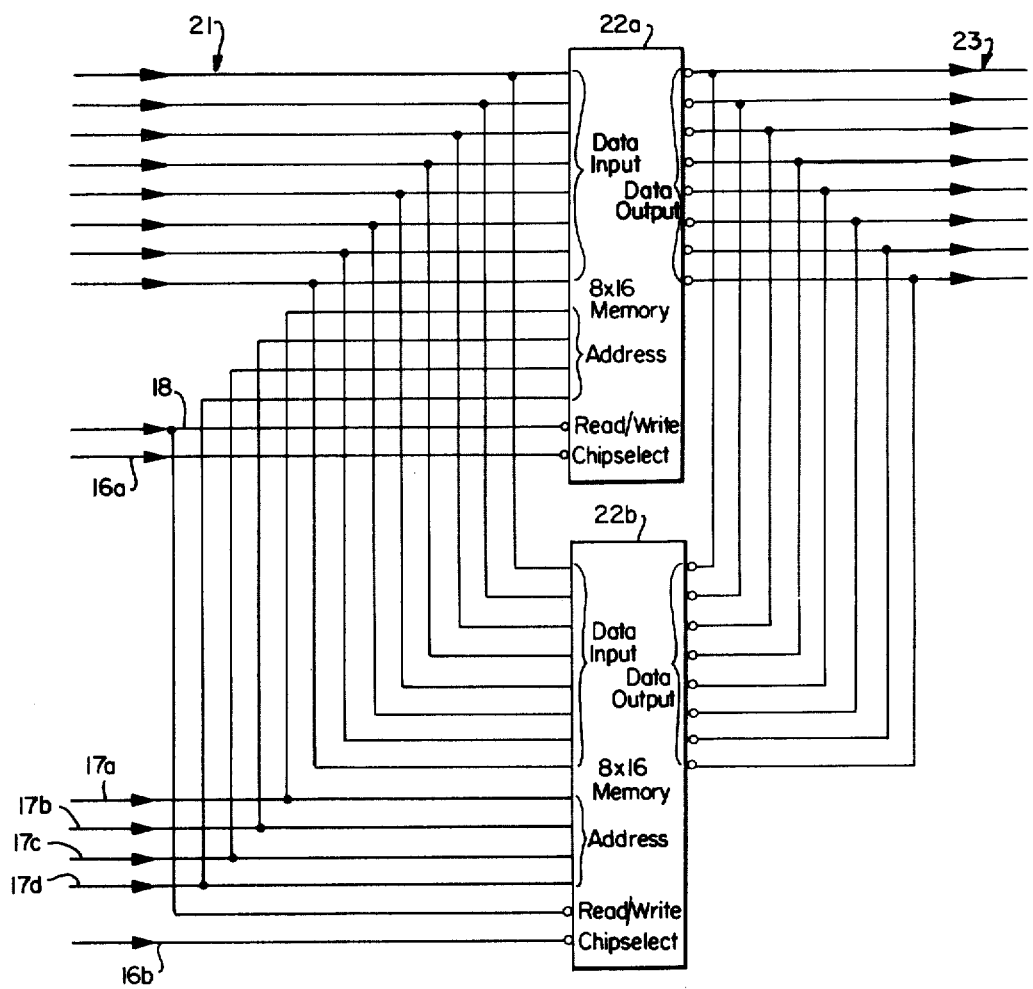
FIG. 5 is a detailed circuit diagram of the memory array block of FIG. 1.

Low going pulses on either line 6a or line 6c are fed to NAND gate 7a causing its output to pulse high. The leading edge of this pulse triggers the one-shot multivibrator 8 producing a busy signal on line 15 of predetermined duration, e.g., of about 1.1 millisecond. The trailing edge of the pulse from 7a triggers another one-shot 9, producing a negative going pulse of, for example, 150 nanosecond. The trailing edge of this pulse clocks the counter 13 causing it to be incremented or decremented, depending on the count direction signal from gate 7b, and also triggers one-shot multivibrator 10 which produces another pulse after another 150 nanosecond delay which in turn triggers the one-shot multivibrator 11 on its trailing edge. The output of one-shot 11 is a positive going 150 nanosecond pulse which is fed to NAND gate 12 on line 90. If the other input to NAND gate 12 from gate 7c is high when line 90 is pulsed high a low going memory write pulse 18 is produced at the output of gate 12. To summarize, a pulse on either of lines 6a or 6c respectively will generate a 1.1 millisecond busy signal 15 on its leading edge. A pulse on line 6a will cause the memory address lines 17a-d to be incremented after a 150 nanoseconds delay following its trailing edge and after another 150 nanoseconds delay the write pulse 18 is generated for a duration of 150 nanoseconds. Thus, the address of the memory 5 is first incremented and then data is written into memory. On the other hand, a pulse on line 6c will cause the memory address lines 17a-17d to be decremented 150 nanoseconds after its trailing edge. The CPU 81 reads the data while line 6c is pulsed low. Thus the data is read, and then the address is decremented. This timing preserves the last-in first-out feature of the stack memory array 5. The toggle flip-flop 14 is clocked whenever the counter overflows or underflows. The true and inverted outputs on line 16a and line 16b are used to select one of two banks of memory from the memory array 5 as shown in FIG. 5 thus effectively doubling the capacity of the memory. The input NAND gates 7a, 7b, 7c, and 12 may be selected from sections TI SN 7400 whereas the one-shot miltivibrators 8, 9, 10, and 11 respectively may be represented by a TI SN 74121. The flip-flop 15 may be formed from part of a TI SN 7473 connected to the toggle mode.

The memory array detailed in FIG. 5 consists of four 4-bit by 16-word memory circuits such as the TI SN 7489 connected to form two banks of memory, each an 8-bit by 16 word unit. Bank 22a or 22b is selected by the bank select lines 16a or 16b. The particular word in a bank of memory is selected by the binary code of the four address lines 17 (a-d). Whenever a particular word in a particular bank is selected, the data stored in that word are switched onto the memory data output lines 23. If new data is to be written into the selected word, this data is placed on the data input lines 21 and the write line 18 is pulsed low.

The data switches shown in FIG. 6 switch data onto the CPU data input lines 25 (a-h) from either the memory array 5 on lines 23 or from the data entry switches and data selectors 10 from lines 24. The outputs of the 3-state buffer switches 26a-26p respectively are made up using 4-quad units such as the TI SN 74125 in a normally high impedance or floating state thereby permitting other devices to use the CPU data input lines 25 if so desired. Whenever the output control line 6c is pulsed low, the data from lines 23a-h is switched onto lines 25a-h respectively. Similarly, if output control line 6d is pulsed low, data from lines 24a-h is switched onto lines 25a-h. The pulse 6c output from the instruction INP 000 switches memory data onto lines 23 whereas the instruction INP 001 produces control pulse 6d which switches the data entry switch data from lines 24 (a-h) onto the CPU data input lines 25.

Figure 7:
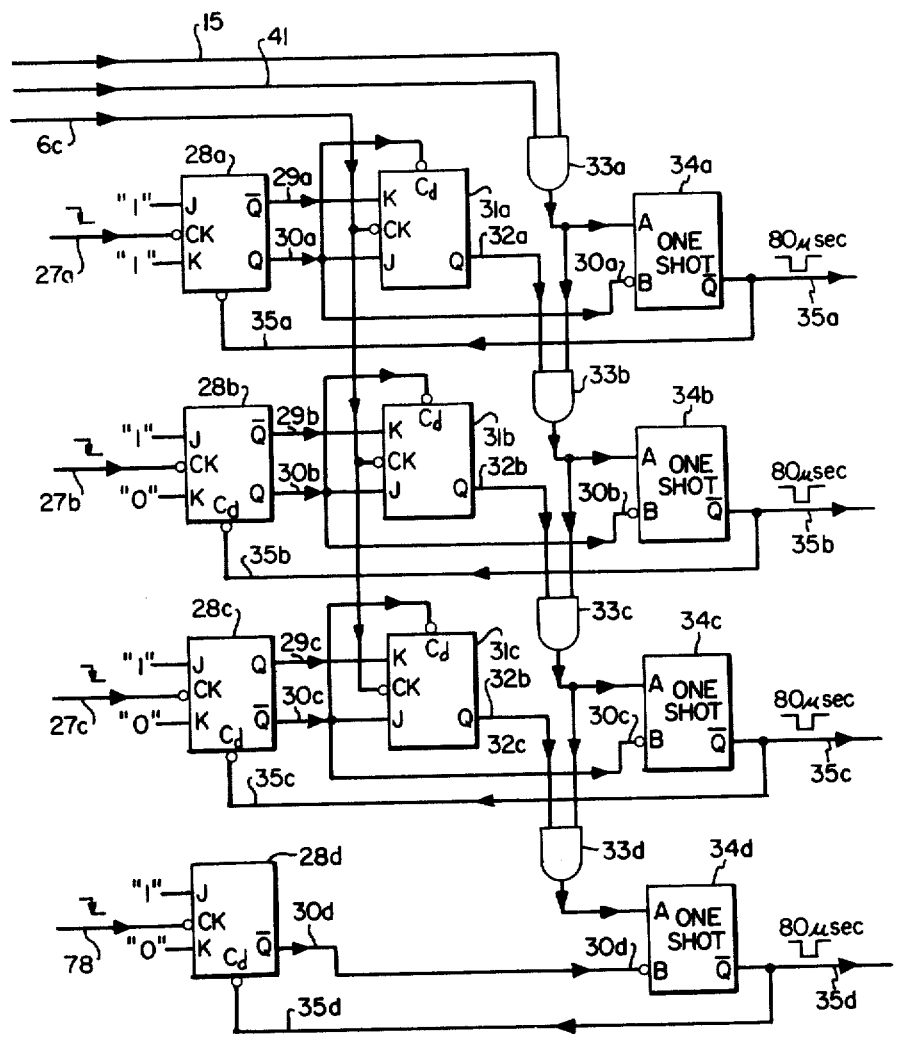
FIG. 7 is a detailed circuit diagram of the interrupt request memory and priority assignment block of FIG. 1.
Figure 13:
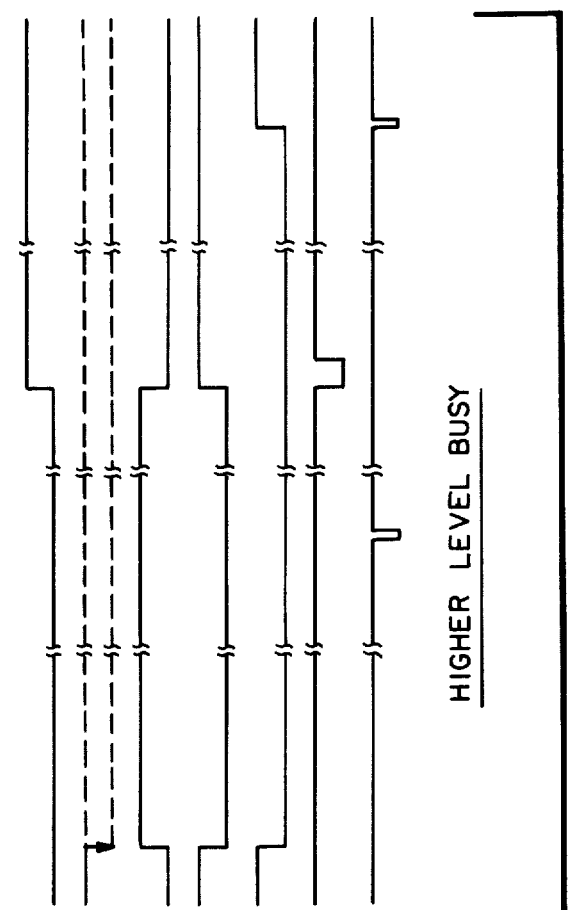
FIG. 13 is a timing diagram of the interrupt request memory of FIG. 1.
Figure 13:
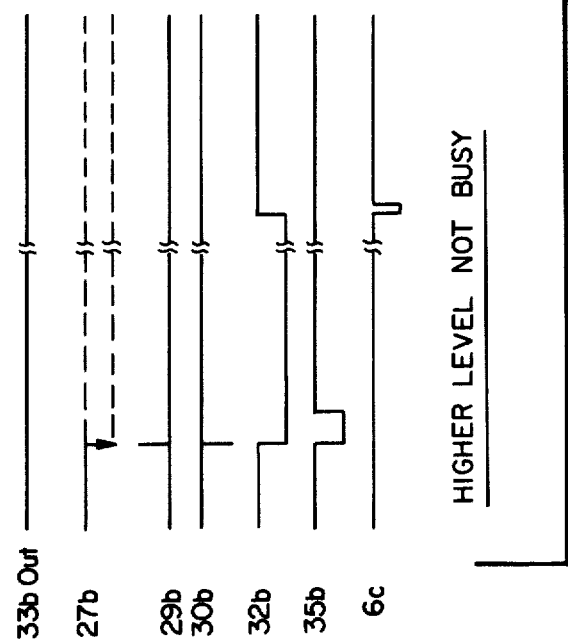

The interrupt request memory and priority assignment section 7 is shown in greater detail in FIG. 7 and consists of four nearly identical sections each representing one level of priority. The operation of the system will be described starting for illustrative purposes, with the second level of priority consisting of two JK flip-flops 28b and 31b, an AND gate 33b and a one-shot multivibrator 34b. A timing diagram which will be helpful in following the operation of the circuit is shown in FIG. 13. Whenever a low going pulse is received on the second level interrupt request line 27b, the JK flip-flop 28b is clocked so that its outputs 29b and 30b become the same as the steering inputs J and K. Thus 29b becomes a logic "1" or high and 30b becomes a logic "0" or low. When this occurs, the low on 30b clears the JK flip-flop 31b through its $C_D$ input. This produces a low on 32b which is fed to the lower priority level stages through gates 33c and 33d to prevent them from being able to issue an interrupt pulse, thus assigning a priority and locking out the lower priority stages. The order of priority is assured through AND gates 33b, 33c, and 33d which establish the priority assignment for all four levels. A low on either inputs of the AND gates 33b, 33c or 33d will lock out the next lower stage, but not the next higher stage, i.e., a low on line 32b causes the outputs of both AND gates 33c and 33d to be low.

When line 30b goes low, in addition to clearing flip-flop 31b, the "B" input of one-shot 34b goes low. This causes one-shot 34b to be triggered into generating an interrupt pulse 35b if and only if the output of gate 33b is high, indicating that the first interrupt level is inactive. It should be understood that any number of interrupt levels could have been used in which case all of the higher levels would have to be inactive. If a higher level is active as indicated by a low output on 33b, 34b will not be triggered and the second level interrupt request will be locked out. Although all lower level interrupt requests are in this manner locked out they are not lost. Instead the state of the lower level flip-flops 28b, 28c and 28d will indicate the presence of a suspended lower order request which await completion of all higher order interrupt operations. When the higher, or first level, in this case, become inactive, the output of gate 33b goes high, triggering one-shot 34b, and generating the interrupt pulse 35b. The interrupt pulse 35b is fed to the interrupt instruction generator of FIG. 8 and is also fed back to the $C_D$ input of the interrupt request flip-flop 28b, clearing the request and enabling it to receive another request. Flip-flop 31b is unaffected by this operation and 32b remains low, indicating to lower levels that the second level is still active. The "level busy" signal is cleared or made high whenever low going pulses on 6c are received. These pulses are generated by the port selector 2 whenever the INP 000 instruction is recognized by the CPU 81. This instruction is used in the RECALL subroutine (shown in Appendix A) which normally appears at the end of each interrupt program. The pulses on line 6c do not actually clear flip-flop 31b, but rather clock in the data from flip-flop 28b, so that if the interrupt request on 28b has not been honored, namely, line 30b is low and line 29b is high, the "level busy" on line 32b will remain low. Only if flip-flop 28b has been clearly by the interrupt pulse 35b, will the level busy line 32b be cleared to the high state. In this way, the integrity of the priority system is retained.

As earlier indicated the order of priority is determined by the AND gate 33a, 33b, 33c, and 33d which form a priority chain. A low on either input to any one of the AND gates will cause its output to be low, giving rise to a "higher level active" signal to all lower level stages of the priority chain. The priority chain is completed at the highest priority level, i.e., the first level in the four level chain of FIG. 7. Hence, if either input to AND gate 33a from line 41 or line 15 is low, the remaining stages of the priority chain indicates a busy and all lower order interrupts are inhibited. A signal from lines 15 and/or 41 is used to inhibit interrupts during the CPU register saving and recalling routines. The system "busy" signal 15 was discussed above with respect to the discussion of the memory control system of FIG. 4. The signal on line 41 is an interrupt busy signal which is generated when an interrupt request is honored. This signal is sufficiently wide that it overlaps the system "busy" signal on line 15 and thus prevents a possible second interrupt busy signal from being generated in the short duration between the generation of a CPU interrupt and the recognition of that interrupt by the CPU 81 upon entry to the SAVE program which initiates the system busy on line 15. The circuitry for the four levels of interrupt request are nearly the same both in circuitry and in function. One difference is that the JK inputs on the highest priority level request flip-flop 28a are both connected high. This converts the flip-flop 28a into a toggle-type device whose outputs do not follow the data on the JK inputs, but rather toggle or change with each low going pulse on the interrupt request line 27a. This variation is necessary on the highest level to make that level selfclearing in the event that a condition exists when power is applied to the system such that flip-flop 28a set for an interrupt but 34a is not triggered. The other difference lies in the omission in the fourth or lowest level system of a level busy flip-flop such as the flip-flops 31(a-c) of higher levels. The JK flip-flops 28 (a-d) and 31 (a-c) may be represented by TI SN 7473, the AND gates 33 (a-d) by TI SN 7408 and the one-shots 34 (a-d) by TI 74121 used with a pulse width of 80 μ seconds.

Figure 8:
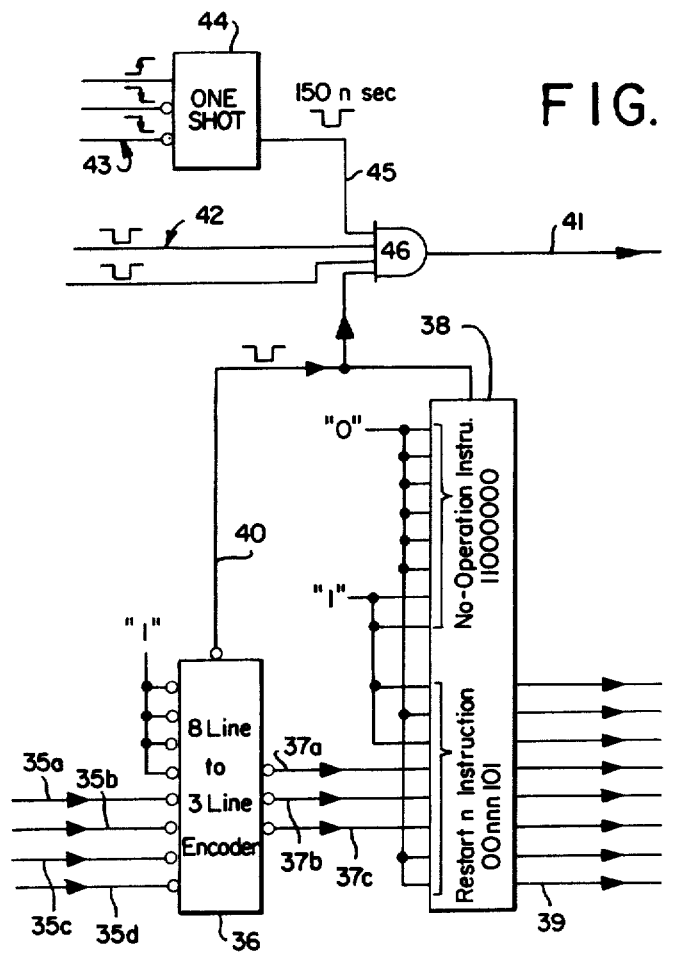
FIG. 8 is a detailed circuit diagram of the interrupt signal and instruction generator block of FIG. 1.

The interrupt pulses 35 (a-d) are serviced in the interrupt instruction generator shown in detail in FIG. 8. A low going pulse on one of lines 35a-d causes a binary number to be generated by the 8-line-to-3-line encoder 36, a TI SN 74148. This binary data, appearing on lines 37a-c is fed to data selectors 38 (two TI SN 74157) which are wired to generate a no-operation instruction designated by the binary numbers 11 000 000, or a restart instruction designated by the binary number 00 nnn 101, depending on the state of line 40. The letters nnn represent the binary data 37 from 36 which encodes the pulses from 35a-d as follows:

| LINES | | | | LINES | | | |
|---|---|---|---|---|---|---|---|
| 35a | 35b | 35c | 35d | 37a | 37b | 37c | INSTRUCTION |
| 0 | 1 | 1 | 1 | 0 | 1 | 1 | RESTART 030 |
| 1 | 0 | 1 | 1 | 0 | 1 | 0 | RESTART 020 |
| 1 | 1 | 0 | 1 | 0 | 0 | 1 | RESTART 010 |
| 1 | 1 | 1 | 0 | 0 | 0 | 0 | RESTART 000 |

Line 40 goes low whenever any of lines 35a-d goes low. Whenever line 40 is low, data selectors 38 select the restart instruction; otherwise the no-operation instruction is selected. The instruction is switched onto the interrupt instruction lines 39 to be read by the CPU 81. The low going pulse on line 40 is also supplied as an input to the 4-input AND gate 46 formed from two sections of a TI SN 7420 connected in series. The output of AND gate 46 becomes the interrupt signal 41 to the CPU 81. The interrupt signal may also be generated externally through lines 42 or by the one-shot 44 which is an edge triggered device; being triggered by external signals 43. This one-shot is a TI SN 74121 used with 150 nanosecond pulse width. With this circuit, interrupt pulses originating from the priority system through lines 35a-d will generate the restart instruction, while requests originating on lines 42 or 43 will interrupt the CPU with a no-operation instruction. As an alternative mode of operation, lines 42 may be used to inhibit interrupts to the CPU 81 by holding one or the other low.

Figure 14:
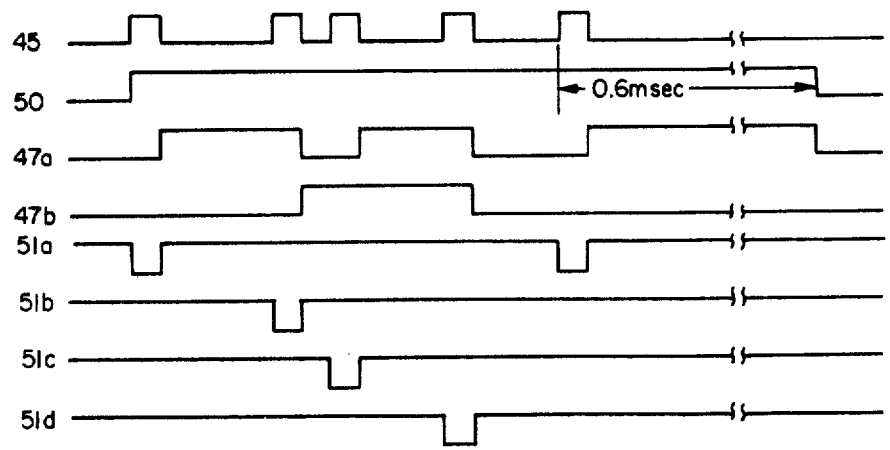
FIG. 14 is a timing diagram for the front panel display circuit of FIG. 1.
Figure 9:
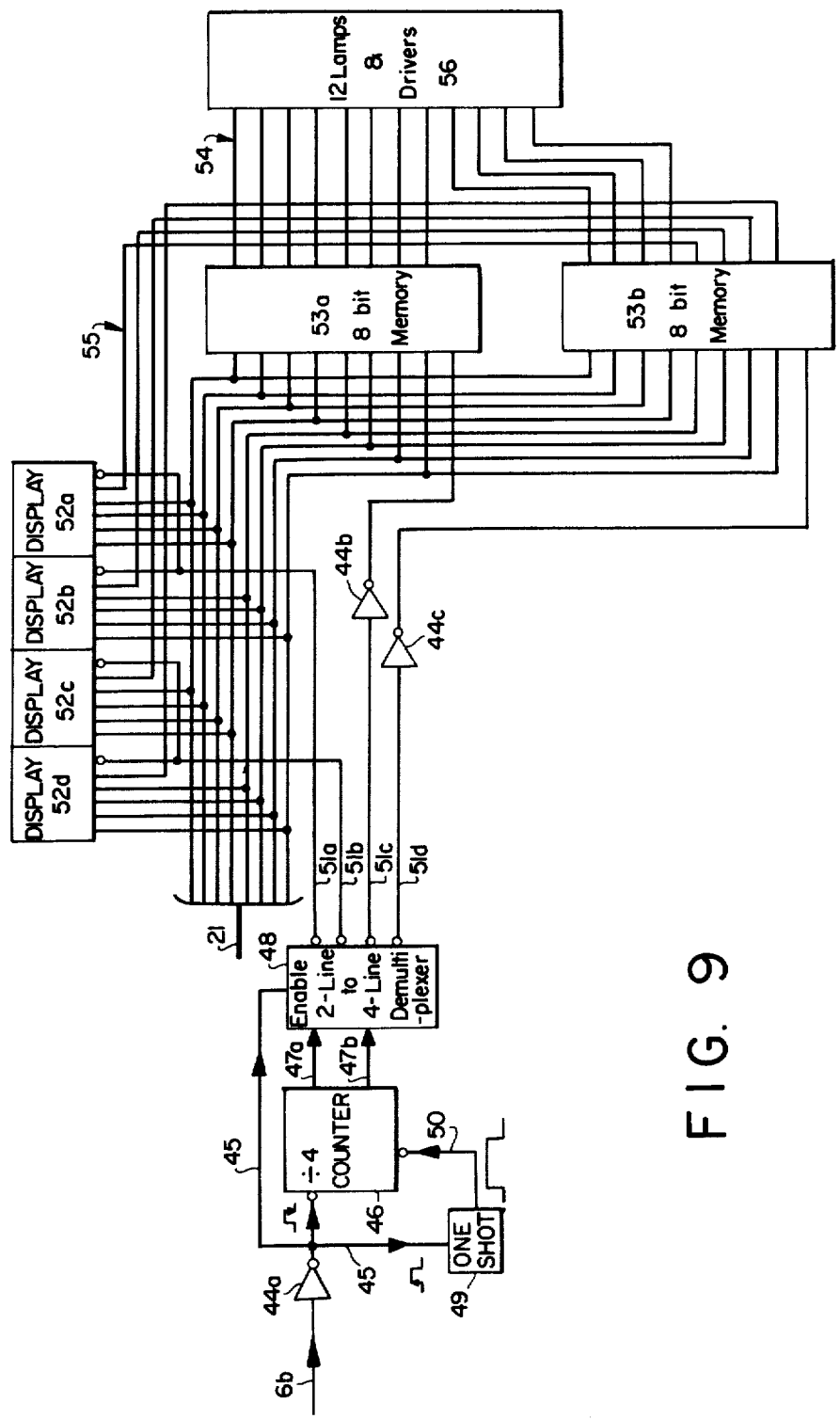
FIG. 9 is a detailed circuit diagram of the front panel display block of FIG. 1.

The front panel display unit which is a part of this system is shown schematically in FIG. 9. Physically the unit consists of a four-digit numerical display 52a-d and 12 light-emitting-diode (LED) status indicators 56 and the necessary circuitry to operate them. The inputs to the display unit consist of the OUT 011 signal 6b derived from the I/O port selector 2 and the buffered data input 21 from the data buffers 3. In operation, the CPU 81 upon recognition of the OUT 011 instruction, places the proper data on the data lines 19 and the appropriate actual number on lines 1a-c for the port selector 2 to generate pulse 6b. Pulse 6b is inverted by 44a, a TI SN 4704, into the signal 45. Signal 45 is applied simultaneously to the counter 46, the retriggerable one-shot 49 and the demultiplexer 48. The leading edge of the signal pulse 45 triggers the retriggerable one-shot 49, a Fairchild 9601 with a time-out of approximately 0.6 milliseconds. This removes the counter reset clear signal 50 from the divide-by-four counter 46 formed from two TI SN 7473 JK flip-flops used in a toggling mode. Signal 45 also enables the demultiplexer 48, causing the output selected by 47a and 47b to go low. The counter 46 is connected to the demultiplexer 48 such that line 51a is selected at the count of 00, line 51b at the count of 01, line 51c at the count of 10 and line 51d at the count of 11. The trailing edge of pulse 45 clocks the counter 46. Hence, the first occurring pulse 45 triggers 49 removing the clear signal 50 from counter 46, enables 48 causing line 51a to pulse low, and steps the counter 46 to the next count. Each successive pulse 45 continues this cycle with lines 51b, 51c and 51d following in sequence. Each pulse 45 also retriggers one-shot 49 thus re-initiating its time-out period. After no pulses have been received for the time-out period of 0.6 milliseconds, 49 resets, causing the counter reset line 50 to go low thereby resetting the counter for the next sequence of output pulses. A timing diagram for this operation is shown in FIG. 14. It should be noted that it is not necessary to run through the entire count sequence of 0-1-2-3; the counters are automatically reset to 00 if no data is received within 0.6 milliseconds.

The pulses on lines 51a-d are used to enable memories in the display modules 52a-d and the 8-bit memories 53a-b. The display units are Hewlett Packard 5082-7300 devices, each accepting a 4-bit binary code to display the numbers 0 through 9. Special codes are used to display a minus sign or to blank the display. Thus eight bits of data as received on lines 21 may be used to set 2 display digits. Bits 0 through 3 are fed to 52a and 52c while bits 4 through 7 are fed to 52b and 52d. The digits are enabled by 51a and 51b. Thus, two OUT 011 instructions are used to load the four digits of display; the two least significant digits are loaded the first time, the two most significant digits are loaded on the second OUT 011. The next two OUT 011 instructions will pulse lines 51c and 51d, respectively, loading memories 53a and 53b, respectively, each with the eight bits of data appearing on lines 21 at the time. These memories each consist of two TI SN 7475 quad latches. Inverters 44b and 44c are used to invert 51c and 51d because these latches require a positive-going pulse. The latched data in 53a and the four least significant bits from 53b are used to control 12 light-emitting diode status indicators 56. These LEDs are driven by two hex LED drivers, TI SN 75492. The four most significant bits from 53b are used to control the display (52a-d) decimal points through lines 55.

Figure 15:
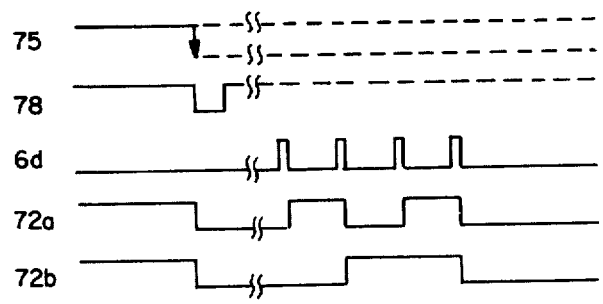
FIG. 15 is a timing diagram for the manually controlled data entry switches.

The date entry switches shown in FIG. 10 provide a means of manually entering data to the system. This is accomplished by providing an interrupt request over line 78 and then providing a means of scanning a series of thumbwheel switches which are preset with data. A timing diagram for a portion of this circuit is shown in FIG. 15.

The interrupt request system consists of nine manual pushbuttons switches numbered 57a through 57h and 73 which are used as function switches. The circuits 58a through 58h and 74 are used to translate the mechanized state of each of function switches 57a-57h and 73b respectively, into a corresponding electrical state. FIG. 11 is a detailed schematic representation illustrative of each combination of a function switch 57 and an interface or debounce circuit 58. The circuit 58 consists of two NAND gates representing sections of a TI SN 400. The outputs 59a-h from the circuits 58a-h, are fed to an 8-line-to-3-line encoder 60 such as a TI SN 74148. This encoder provides a binary switch identification number on lines 62a-c as well as a low going signal on line 61 whenever any of the function switches 57a through 57h and 73 is depressed. Line 61 as well as line 75 from switch 73 labeled the "enter" button, are fed to a one-shot 77 such as TI SN 74121 for providing a 500 nanosecond interrupt request pulse 78. A low going signal on either line 61 or line 75 will trigger the one-shot 77 producing the interrupt request pulse 78 which is fed to the interrupt request memory 7 as the lowest priority request line. One-shot 77 may be deactivated by opening switch 76 which is normally a key-switch designated as an "interlock" switch.

The CPU 81 will respond to the interrupt request 78 and, depending upon how it is programmed, it may scan and read the thumbwheel data switches 63a-j to obtain data. The ten thumbwheel switches consist of six octal digits making up the six most significant digits and four binary coded decimal digits, making up the four least significant digits. Thus, in FIG. 10, 63a-d are BCD switches, and 63e-h are octal. In addition, only two bits of data are read from 63g and 63j; making them valid for numbers 0 through 3 only. The switches are scanned in four groups of eight bits each, in the order 63h-j first, 63e-g next, 63c-d next and finally 63a-b. The data is multiplexed by data selector 70 which consists of four TI SN 74153 dual four channel multiplexers interconnected as an eight-bit-four-channel data selector. The selected data is fed through lines 24 to the data switches 2E. The data selector 70 is controlled by a divide-by-four counter 71, consisting of two JK flip-flops, a TI SN 7473. The counter is reset to 00 by the interrupt request signal 78.

The CPU 81 reads the thumbwheel switch data by means of the INP 001 instruction which is decoded by the I/O port selector 2 and generates the signal 6d. The signal 6d activates the data switches as described above and also steps the counter 71 on its trailing edge, preparing the data selector for the next reading.

The data from the two most significant thumbwheel switches is routed though an additional data selector 68a, which consists of a TI SN 74157 quad two-input data selector and two sections of a TI SN 7400 NAND gate connected as a two-input AND gate 68b. Whenever a function switch 57a–h is depressed, line 61 goes low, causing the data selector 68a to place the function switch number 62a–d on the data lines 69a–d, rather than thumbwheel switch data 67d–g. The fourth function switch number 62d is set at a logic "0". The AND gate 68b effectively multiplexes the remaining thumbwheel switch data line 67h. Whenever 61 is low, the output of this gate 69e is held low, thus placing a logic "0" on that line. Whenever 61 is high, the data on 67h is fed through to 69e. Thus, when 61 is high, the thumbwheel switch data 67d–h is placed on lines 69a–e. Alternatively, whenever 61 is low, the function switch number on lines 62a–c is placed on 69a–c and 69d–e are held at a logic "0".

The data selector 68, is used to bypass reading the two most significant thumbwheel switches 63i–j in favor of the function switch number 62a–d if a function switch 57a–h is depressed. The two most significant thumbwheel switches 63i–j may be used as an operation code. The more frequently used codes can be then assigned to values 00 through 07 and then may be invoked by depressing a function button, 57a–h. This has the same effect as dialing the code into the two most significant thumbwheels 63i–j and depressing the "enter" button 73.

| ;REGISTER AND FLAG SAVING ROUTINE | | |
|---|---|---|
| SAVE: | OUT ϕ1ϕ0 | ;SUCCESSIVELY OUTPUT |
| | MOV A,B | ;REGISTERS |
| | OUT ϕ1ϕ0 | |
| | MOV A,C | |
| | OUT ϕ1ϕ0 | |
| | MOV A,D | |
| | OUT ϕ1ϕ0 | |
| | MOV A,E | |
| | OUT ϕ1ϕ0 | |
| | MOV A,H | |
| | OUT ϕ1ϕ0 | |
| | MOV A,L | |
| | OUT ϕ1ϕ0 | |
| | MVI A,ϕ | ;GENERATE FLAG INFORMATION BITS |
| | MOV B,A | ;INITIALIZE A=B=C=D |
| | MOV C,A | |
| | MOV D,A | |
| | JNC SAV1 | |
| | MVI B,8ϕH | ;IFCARRY=T, B1T7=1 |
| SAV1: | JZ SAV3 | |
| | MVI C,1ϕH | ;OTHERWISE BIT4=1 |
| | JP SAV2 | |
| | MVI D,4ϕH | ;IF SIGN=P, BIT6=1 |
| SAV2: | MOV A,C | |
| | RRC | ;BIT5=BIT6 |
| | JPO SAV3 | |
| | XRI 2ϕH | ;IF PARITY=E, INVERT BIT5 |
| SAV3: | ORA B | ;ASSEMBLE WORD & OUTPUT |
| | ORA C | |
| | ORA D | |
| | OUT ϕ1ϕ0 | |
| | RET | |
| | ;RESTORE REGISTERS AND FLAGS | |
| RECAL: | IN ϕϕϕ0 | |
| | MOV B,A | |
| | ANI ϕCϕH | |
| | ADD B | ;RESTORE FLAGS |
| | IN ϕϕϕ0 | ;SUCCESSIVELY INPUT |
| | MOV L,A | ;REGISTER DATA |
| | IN ϕϕϕ0 | |
| | MOV H,A | |
| | IN ϕϕϕ0 | |
| | MOV E,A | |
| | IN ϕϕϕ0 | |
| | MOV D,A | |
| | IN ϕϕϕ0 | |
| | MOV C,A | |
| | IN ϕϕϕ0 | |
| | MOV B,A | |
| | IN ϕϕϕ0 | |
| | RET | |

What is claimed is:

1. An interrupt control system for handling a multiplicity of real time interrupt request signals to a central processing unit of a microcomputer comprising:
   means including a multiplicity of interrupt control sections each having an assigned level of priority for generating a predetermined interrupt pulse in response to the occurrence of each of said interrupt request signals;
   means responsive to the level of priority of each interrupt request signal for locking out each interrupt control section to which interrupt request signals of lower priority are applied;
   means for generating an interrupt instruction for said central processing unit in response to each predetermined interrupt pulse;
   means for generating an interrupt busy signal of predetermined duration in response to the generation of an interrupt instruction; and
   means responsive to said interrupt busy signal for inhibiting such multiplicity of interrupt control sections during said predetermined time duration.

2. An interrupt control system as defined in claim 1 wherein said means for locking out interrupt control sections comprises:
   means for generating a priority level busy signal in response to the level of priority of each interrupt request signal and gating means responsive to said priority level busy signal for inhibiting each control section having a lower preassigned priority.

3. An interrupt control system as defined in claim 2 wherein said gating means comprises a priority chain of serially connected AND gates with the AND gate corresponding to the highest level of priority being responsive to said interrupt busy signal.

4. An interrupt control system as defined in claim 1 further comprising memory means for storing and restoring register and/or flag data supplied from said central processing unit in response to at least one predetermined interrupt instruction including a memory array and a memory control circuit, said memory control circuit comprising:
   counter means for addressing said memory array;
   means for setting the direction of said counter means to count up when data is to be read into said array and to count down when data is to be read from said memory array;
   means for generating increment pulses;
   means responsive to said increment pulses for incrementing said counter means;
   first delay means responsive to each increment pulse for generating a write pulse a predetermined time following the occurrence of each increment pulse;
   means for generating decrement pulses; and
   second delay means responsive to each decrement pulse for decrementing said counter means a predetermined time following the occurrence of each decrement pulse.

5. An interrupt control system as defined in claim 4 wherein said predetermined time duration of said interrupt busy signal is longer than the time necessary to store or restore registor and/or flag data supplied from said central processing unit.

6. An interrupt control system as defined in claim 5 wherein at least one of said interrupt request signals is provided by a manual data entry system comprising:
   means for generating an interrupt request pulse in response to a manual command;
   a multiplicity of manually encodable switches;
   means for converting the encoded information into binary data; and
   means for generating an instruction for said central processing unit to read said data.

* * * * *